(12) United States Patent
Geissler et al.

(10) Patent No.: US 12,539,604 B2
(45) Date of Patent: Feb. 3, 2026

(54) HAZARD EXPLORATION, ESTIMATION, AND RESPONSE SYSTEM AND METHOD

(71) Applicant: Intel Corporation, Santa Clara, CA (US)

(72) Inventors: Florian Geissler, Munich (DE); Frederik Pasch, Karlsruhe (DE); Cornelius Buerkle, Karlsruhe (DE); Ralf Graefe, Haar (DE); Fabian Oboril, Karlsruhe (DE); Yang Peng, Munich (DE); Kay-Ulrich Scholl, Malsch (DE)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 17/561,132

(22) Filed: Dec. 23, 2021

(65) Prior Publication Data

US 2022/0118611 A1  Apr. 21, 2022

(51) Int. Cl.
  *B25J 9/16* (2006.01)
  *A62C 27/00* (2006.01)

(52) U.S. Cl.
  CPC ............. *B25J 9/163* (2013.01); *A62C 27/00* (2013.01); *B25J 9/161* (2013.01); *B25J 9/1682* (2013.01)

(58) Field of Classification Search
  CPC . B25J 9/163; B25J 9/161; B25J 9/1682; B25J 9/1679; B25J 9/1674; A62C 27/00; A62C 99/00; G06N 3/008; G06N 3/044; G06N 3/045; G06N 3/0464; G06N 3/047; G06N 3/0475; G06N 3/0495; G06N 3/084; G06N 3/092; G06N 5/01; G06N 20/10; G06N 20/20
  See application file for complete search history.

(56) References Cited

U.S. PATENT DOCUMENTS

| | | | |
|---|---|---|---|
| 11,016,491 B1 * | 5/2021 | Millard | G06N 3/045 |
| 2016/0129592 A1 * | 5/2016 | Saboo | B25J 5/007 |
| | | | 700/248 |
| 2018/0111274 A1 * | 4/2018 | Seok | G05D 1/0027 |
| 2019/0197396 A1 * | 6/2019 | Rajkumar | B25J 9/1671 |
| 2019/0275629 A1 * | 9/2019 | Ogawa | G05B 19/406 |
| 2020/0338733 A1 * | 10/2020 | Dupuis | B25J 9/1666 |
| 2021/0192358 A1 * | 6/2021 | Song | G06N 3/044 |
| 2022/0147058 A1 * | 5/2022 | Dupuis | B25J 9/1666 |

OTHER PUBLICATIONS

Bayesian Reinforcement Learning for Multi-Robot Decentralized Patrolling in Uncertain Environments (Year: 2019).*

(Continued)

*Primary Examiner* — Adam R Mott
*Assistant Examiner* — Sagar Kc
(74) *Attorney, Agent, or Firm* — Banner & Witcoff, Ltd.

(57) ABSTRACT

Techniques are disclosed for the exploration of environments for the estimation and detection of hazards or near hazards within the environment and the mitigation of hazards therein. The exploration of the environment and mitigation of hazards therein may use one or more autonomous agents, including a hazard response robot. The estimation of the hazards may use a policy learning engine, and the hazards may be detected, and the associated risks therefrom, may be determined using a hazard estimation system.

12 Claims, 11 Drawing Sheets

(56) References Cited

OTHER PUBLICATIONS

J. Andrew Bagnell, "Reinforcement Learning in Robotics: A Survey," Springer Tracts Adv. Robot., vol. 97, pp. 9-67, 2014.
S. Oberer and R. D. Schraft, "Robot-dummy crash tests for robot safety assessment," Proc.—IEEE Int. Conf. Robot. Autom., No. April, pp. 2934-2939, 2007.
A. Sharma, M. Ahn, S. Levine, V. Kumar, K. Hausman, and S. Gu, "Emergent Real-World Robotic Skills via Unsupervised Off-Policy Reinforcement Learning," 2020.
X. Zhou, et al., "Bayesian Reinforcement Learning for Multi-Robot Decentralized Patrolling in Uncertain Environments", IEEE Transactions on Vehicular Technology, vol. 68, No. 12, 13 pgs., Dec. 1, 2019.
G. Shen, et al., "Deep Reinforcement Learning for Flocking Motion of Multi-UAV Systems: Learn From a Digital Twin", IEEE Internet of Things Journal, vol. 9, No. 13, 13 pgs., Nov. 12, 2021.
May 3, 2023 (EP) Search Report—App. 22212583.3.

\* cited by examiner

HAZARD EXPLORATION, ESTIMATION, AND RESPONSE SYSTEM AND METHOD

TECHNICAL FIELD

The disclosure described herein generally relate to the exploration of environments for the estimation and detection of hazards or near hazards within the environment and the mitigation of hazards therein, including the exploration of the environment and mitigation of hazards therein using one or more autonomous agents.

BACKGROUND

In factories, warehouses, hospitals, and other industrial and/or commercial environments, hazards or potentially hazardous situations are generally difficult detect given the rarity of hazards and the typical complex chain of events resulting in such hazards. Further, such environments generally include many rooms, some with different dangerous objects and materials. The location of these objects and materials is dynamic and the proximity of objects may further increase the hazardous risks associated with such objects.

While hazardous situations may be detected through simulations, systems complexities limit such simulations. Further, brute-force testing is cost-intensive and does not sufficiently capture the long probability tail of hazardous events.

BRIEF DESCRIPTION OF THE DRAWINGS/FIGURES

The accompanying drawings, which are incorporated herein and form a part of the specification, illustrate the present disclosure and, together with the description, and further serve to explain the principles of the disclosure and to enable a person skilled in the pertinent art to make and use the techniques discussed herein.

The present disclosure will be described with reference to the accompanying drawings. The drawing in which an element first appears is typically indicated by the leftmost digit(s) in the corresponding reference number.

DETAILED DESCRIPTION

Figure 1:
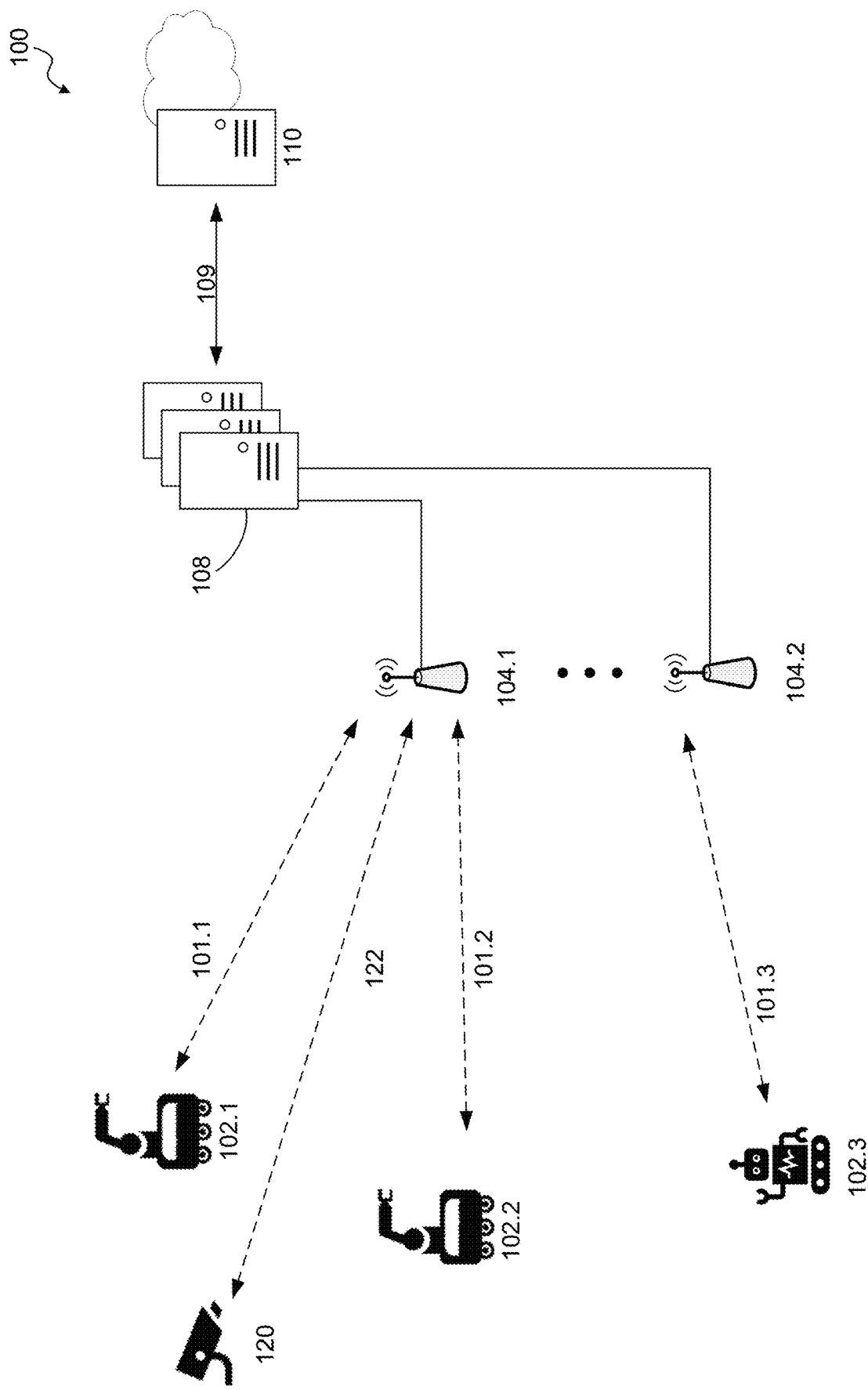
FIG. 1 illustrates a block diagram of an exemplary environment utilizing autonomous mobile robots (AMRs), in accordance with the disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

The detection and prevention of hazardous events in environments, including robotics and autonomous environments advantageously reduces the risk to humans within the environments, and the potential financial, legal, and other harms that may results. The disclosure is applicable to environments where humans are isolated from active autonomous environments as well as environments where human and autonomous agents may share the environment.

The present disclosure provides an advantageous solution to determine potential and/or actual hazards within the environment using autonomous agents, such as autonomous mobile robots (AMRs). The environment may be a partial or fully autonomous environment, or one that is free of autonomous agents (non-autonomous environments). Autonomous agents, such as AMRs, are increasing being adapted for use in factories, warehouses, hospitals, and other industrial and/or commercial environments. Autonomous mobile platforms implement perception and manipulation jointly to accomplish a given task by navigating an environment. AMRs may communicate and coordinating with one other and/or with a central controller. Robotics and autonomous mobile platforms may create hazardous environments for humans and safety monitoring of the present disclosure advantageously reduce or prevent the occurrence of hazardous events within the environment.

According to the disclosure, a swarm of cooperative autonomous agents (which may be referred to as "dummy" robots) may be controlled to seek out and detect unknown hazards in an environment. The exploration of an environment is also applicable to identify "soft hazards" or discomfort, such as design or other deficiencies (e.g. inaccessibility of the environment for (e.g. physically) challenged individuals.) The type of autonomous agents may be selected to correspond to the expected users within the environment (e.g. humanoid shaped for human users).

Additionally or alternatively, continuously updated representations of dangerous/hazardous objects within the environment may be generated. Such representations may also be made available when a disaster leads to partial or complete damage of the site's infrastructure.

Additionally or alternatively, an autonomous agent configured as a hazard response robot may be automatically or manually triggered based on the representations of the environment. The robot may be configured to obtain information about the affected areas where no longer any observation information via infrastructure sensors is available.

FIG. 1 illustrates an exemplary environment 100. The environment 100 may utilize autonomous mobile robots (AMRs) 102 in accordance with the disclosure. The environment 100 supports any suitable number of AMRs 102, with three AMRs 102.1-102.3 being shown for ease of explanation. The environment 100 may include one or more sensors 120 configured to monitor the locations and activities of the AMRs 102, humans, machines, other robots, or other objects (as would be understood by one of ordinary skill in the art) within the environment 100. The sensors 120 may include, for example, radar, LIDAR, optical sensors, infrared sensors, cameras, or other sensors as would be understood by one or ordinary skill in the art. The sensors may communicate information (sensor data) with the computing device 108 (via access point(s) 104). Although not shown in FIG. 1 for purposes of brevity, the sensor(s) 120 may additionally communicate with one another and/or with one or more of the AMRs 102.

The environment 100 may be any suitable type of environment that may use AMRs 102, such as a factory, warehouse, hospital, office building, etc. The AMRs 102 may have any suitable type of design and function to communicate with other components of a network infrastructure as further disused below. The AMRs 102 may operate autonomously or semi-autonomously and be configured as mobile robots that move within the environment 100 to complete specific tasks. One or more of the AMRs 102 may alternatively be configured as a stationary robots having moveable components (e.g. moveable arms) to complete localized tasks.

Figure 2:
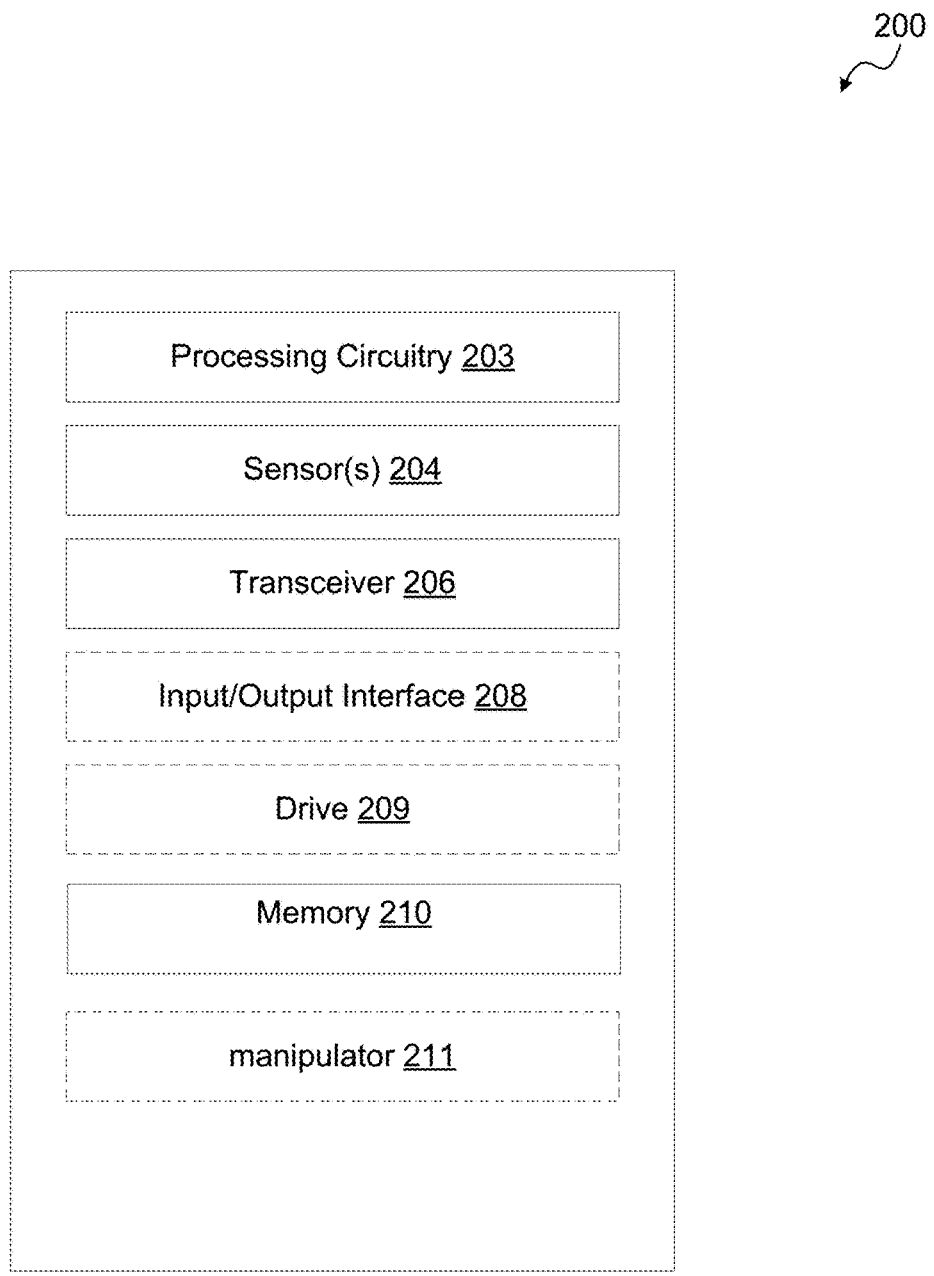
FIG. 2 illustrates a block diagram of an exemplary autonomous mobile robot (AMR) in accordance with the disclosure.

The AMRs 102 may include any suitable number and/or type of sensors to enable sensing of their surroundings and the identification of feedback regarding the environment 100. The AMRs 102 may further be configured with any suitable number and/or type of wireless radio components to facilitate the transmission and/or reception of data. For example, the AMRs 102 may transmit data indicative of current tasks being executed, location, orientation, velocity, trajectory, heading, etc. within the environment 100 (via transceiver 206 as shown in FIG. 2). As another example, the AMRs 102 may receive commands and/or planned path information from the computing device 108, which each AMR 102 may execute to navigate to a specific location within the environment 100. Although not shown in FIG. 1 for purposes of brevity, the AMRs 102 may additionally communicate with one another to determine information (e.g. current tasks being executed, location, orientation, velocity, trajectory, heading, etc.) with respect to the other AMRs 102, as well as other information such as sensor data generated by other AMRs 102.

Although the disclosure includes examples of the environment 100 being a factory or warehouse that supports AMRs 102 operating within such an environment, this is by way of example and not limitation. The teachings of the disclosure may implemented in accordance with any suitable type of environment and/or type of mobile agent. For instance, the environment 100 may be outdoors and be identified with a region such as a roadway that is utilized by autonomous vehicles. Thus, the teachings of the disclosure are applicable to AMRs as well as other types of autonomous agents that may operate in any suitable type of environment based upon any suitable application or desired function.

The AMRs 102 operate within the environment 100 by communicating with the various components of the supporting network infrastructure. The network infrastructure may include any suitable number and/or type of components to support communications with the AMRs 102. For example, the network infrastructure may include any suitable combination of wired and/or wireless networking components that operate in accordance with any suitable number and/or type of communication protocols. For instance, the network infrastructure may include interconnections using wired links such as Ethernet or optical links, as well as wireless links such as Wi-Fi (e.g. 802.11 protocols) and cellular links (e.g. 3GPP standard protocols, LTE, 5G, etc.). The network infrastructure may be, for example, an access network, an edge network, a mobile edge computing (MEC) network, etc. In the example shown in FIG. 1, the network infrastructure includes one or more cloud servers 110 that enable a connection to the Internet, which may be implemented as any suitable number and/or type of cloud computing devices. The network infrastructure may additionally include a computing device 108, which may be implemented as any suitable number and/or type of computing device such as a server. The computing device 108 may be implemented as an Edge server and/or Edge computing device, but is not limited thereto. The computing device 108 and/or server 110 may also be referred to as a controller.

According to the disclosure, the computing device 108 may communicate with the one or more cloud servers 110 via one or more links 109, which may represent an aggregation of any suitable number and/or type of wired and/or wireless links as well as other network infrastructure components that are not shown in FIG. 1 for purposes of brevity. For instance, the link 109 may represent additional cellular network towers (e.g. one or more base stations, eNodeBs, relays, macrocells, femtocells, etc.). According to the disclosure, the network infrastructure may further include one or more access points (APs) 104. The APs 104 which may be implemented in accordance with any suitable number and/or type of AP configured to facilitate communications in accordance with any suitable type of communication protocols. The APs 104 may be configured to support communications in accordance with any suitable number and/or type of communication protocols, such as an Institute of Electrical and Electronics Engineers (IEEE) 802.11 Working Group Standards. Alternatively, the APs 104 may operate in accordance with other types of communication standards other than the 802.11 Working Group, such as cellular based standards (e.g. "private cellular networks) or other local wireless network systems, for instance. Additionally or alternatively, the AMRs 102 may communicate directly with the computing device 108 or other suitable components of the network infrastructure without the need to use the APs 104. Additionally or alternatively, one or more of AMRs 102 may communicate directly with one or more other AMRs 102.

In the environment 100 as shown in FIG. 1, the computing device 108 is configured to communicate with one or more of the AMRs 102 to receive data from the AMRs 102 and to transmit data to the AMRs 102. This functionality may be additionally or alternatively be performed by other network infrastructure components that are capable of communicating directly or indirectly with the AMRs 102, such as the one or more cloud servers 110, for instance. However, the local nature of the computing device 108 may provide additional advantages in that the communication between the computing device 108 and the AMRs 102 may occur with reduced network latency. Thus, according to the disclosure, the computing device 108 is used as the primary example when describing this functionality, although it is understood that this is by way of example and not limitation. The one or more cloud servers 110 may function as a redundant system for the computing device 108.

The computing device 108 may thus receive sensor data from each for the AMRs 102 via the APs 104 and use the respective sensor data, together with other information about the environment 100 that is already known (e.g. data regarding the size and location of static objects in the environment 100, last known locations of dynamic objects, etc.), to generate a shared environment model that represents the environment 100. This shared environment model may be represented as a navigation grid having cells of any suitable size and/or shape, with each cell having specific properties with respect to the type of object contained (or not contained) in the cell, whether an object in the cell is static or moving, etc., which enables the environment model to accurately depict the nature of the environment 100. As an example, grid cells may be squares of predetermined sizes (e.g. 80 mm) based upon a desired granularity for a particular environment and accompanying application. The environment model may thus be dynamically updated by the AMRs 102 directly and/or via the computing device 108 (e.g. by the policy learning engine 402) on a cell-by-cell basis as new sensor data is received from the AMRs 102 to generate an exploration policy for the AMRs 102. The updates to the shared environment model thus reflect any recent changes in the environment 100 such as the position and orientation of each of the AMRs 102 and other obstacles that may change in a dynamic manner within the environment 100 (e.g. people, forklifts, machinery, etc.). The shared environment model may additionally or alternatively be updated based upon data received from other sensors 120 or devices within the environment 100, such as stationary cameras for example, which may enable a more accurate depiction of the positions of the AMRs 102 without relying on AMR communications.

Each AMR 102 may execute a path planning algorithm (exploration policy) and uses the shared environment model at a particular time (e.g. the most recently constructed) to calculate navigational paths for each AMR 102. These navigational paths include sets of intermediate points ("waypoints") or nodes that define an AMR trajectory within the environment 100 between a starting point (e.g. its current location in the environment 100) to a destination (goal point) within the environment 100. That is, the waypoints indicate to the AMRs 102 how to execute a respective planned navigational path to proceed to each of the intermediate points at a specific time until a destination is reached. The path planning algorithm of one or more of the AMRs 102 may be updated by the computing device 108 (e.g. by the policy learning engine 402). According to the disclosure, the computing device 108, server 110, and/or AMR(s) 102 may implement machine-learning to adapt one or more algorithms and/or models configured to control the operation of the AMRs 104 within the environment 100. Additionally or alternatively, one or more of these devices may implement machine-learning capabilities to detect one or more hazards, determine one or more hazard risk levels, or other functions as would be understood by one of ordinary skill in the art.

The computing device 108 may alternatively or additionally (potentially in collaboration with one or more of the AMRs 102) calculate navigational paths for one or more of the AMRs 102. Alternatively or additionally, the cloud server(s) 110 may be configured to calculate navigational paths for one or more of the AMRs 102, which may then be transmitted to the AMRs 102. It should be appreciated that any combination of the AMRs 102, computing device 108, and cloud server(s) 110 may calculate the navigational paths. The AMRs 102, computing device 108, and/or cloud server(s) 110 may include processing circuitry that is configured to perform the respective functions of the AMRs 102, computing device 108, and/or cloud server(s) 110, respectively. One or more of these devices may further be implemented with machine-learning capabilities.

Information dynamically discovered by the AMRs 102 may be, for instance, a result of each AMR 102 locally processing its respective sensor data. The updated shared environment model may be maintained by computing device 108 (e.g. configured as a central controller) and shared with each of the AMRs 102 as well being used for planning tasks. Thus, at any given point in time, the AMRs 102 may be attempting to determine which cells to add to a particular route (e.g. a planned path) or move to so that the assigned tasks of the assigned tasks of the AMRs 102 may be accomplished in the most efficient manner. In other words, because of the dynamic nature of the environment 100, each AMR 102 may calculate its own respective navigation path in a continuous and iterative manner using iterative updates that are provided to the shared environment model. Thus, the shared environment model may be stored in the computing device 108 and/or locally in a memory associated with or otherwise accessed by each one of the AMRs 102. Additionally or alternatively, the shared environment model may be stored in any other suitable components of the network infrastructure or devices connected thereto. In any event, the AMRs 102 may iteratively receive or otherwise access the shared environment model, including the most recent updates, to perform navigation path planning functions as discussed herein. The shared environment model may thus be updated as new sensor data is received by the central controller (computing device 108) and processed, and/or processed locally by the AMRs 102, and be performed in a periodic manner or in accordance with any suitable schedule.

With reference to FIG. 2, the AMRs 102 may implement a suite of onboard sensors 204 to generate sensor data indicative of the location, position, velocity, heading orientation, etc. of the AMR 102 within the environment 100. These sensors 204 may be implemented as any suitable number and/or type that are generally known and/or used for autonomous navigation and environmental monitoring. Examples of such sensors may include radar, LIDAR, optical sensors, cameras, compasses, gyroscopes, positioning systems for localization, accelerometers, etc. Thus, the sensor data may indicate the presence of and/or range to various objects near each AMR 102. Each AMR 102 may additionally process this sensor data to identify obstacles or other relevant information within the environment 100 that will impact the shared environment model. The AMRs 102 may then use the shared environment model to iteratively calculate respective navigation paths, as further discussed herein. The AMRs 102 may also any suitable number and/or type of hardware and software configuration to facilitate autonomous navigation functions within the environment 100, including known configurations. For example, each AMR 102 may implement a controller that may comprise one or more processors or processing circuitry 202, which may execute software that is installed on a local memory 210 to perform various autonomous navigation-related functions.

The AMR 102 may use onboard sensors 204 to perform pose estimation and/or to identify e.g. a position, orientation, velocity, direction, and/or location of the AMR 102 within the environment 100 as the AMR 102 moves along a particular planned path. The processing circuitry 202 can execute a path planning algorithm stored in memory 210 to execute path planning and sampling functionalities for navigation-related functions (e.g. SLAM, octomap generation, multi-robot path planning, etc.) of the AMR 102.

AMR Design and Configuration

FIG. 2 illustrates a block diagram of an exemplary autonomous agent 200, in accordance with the disclosure. The autonomous agent 200 as shown and described with respect to FIG. 2 may be identified with one or more of the AMRs 102 as shown in FIG. 1 and discussed herein. The autonomous agent 200 may include processing circuitry 202, one or more sensors 204, a transceiver 206, and a memory 210. The autonomous agent 200 may additionally include input/output (I/O) interface 208, drive 209 (e.g. when the agent 200 is a mobile agent), and/or manipulator 211. The components shown in FIG. 2 are provided for ease of explanation, and the autonomous agent 200 may implement additional, less, or alternative components as those shown in FIG. 2.

The processing circuitry 202 may be configured as any suitable number and/or type of computer processors, which may function to control the autonomous agent 200 and/or other components of the autonomous agent 200. The processing circuitry 202 may be identified with one or more processors (or suitable portions thereof) implemented by the autonomous agent 200. The processing circuitry 202 may be configured to carry out instructions to perform arithmetical, logical, and/or input/output (I/O) operations, and/or to control the operation of one or more components of autonomous agent 200 to perform various functions associated with the disclosure as described herein. For example, the processing circuitry 202 may include one or more microprocessor cores, memory registers, buffers, clocks, etc., and may generate electronic control signals associated with the components of the autonomous agent 200 to control and/or modify the operation of these components. For example, the processing circuitry 202 may control functions associated with the sensors 204, the transceiver 206, interface 208, drive 209, memory 210, and/or manipulator 211. The processing circuitry 202 may additionally perform various operations to control the movement, speed, and/or tasks executed by the autonomous agent 200, which may be based upon global and/or local path planning algorithms, as discussed herein.

The sensors 204 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, etc.

The transceiver 206 may be implemented as any suitable number and/or type of components configured to transmit and/or receive data packets and/or wireless signals in accordance with any suitable number and/or type of communication protocols. The transceiver 206 may include any suitable type of components to facilitate this functionality, including components associated with known transceiver, transmitter, and/or receiver operation, configurations, and implementations. Although depicted in FIG. 2 as a transceiver, the transceiver 206 may include any suitable number of transmitters, receivers, or combinations of these that may be integrated into a single transceiver or as multiple transceivers or transceiver modules. For example, the transceiver 206 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 206 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

I/O interface 208 may be implemented as any suitable number and/or type of components configured to communicate with the human(s) 115. The I/O interface 208 may include microphone(s), speaker(s), display(s), image projector(s), light(s), laser(s), and/or other interfaces as would be understood by one of ordinary skill in the arts.

The drive 209 may be implemented as any suitable number and/or type of components configured to drive the autonomous agent 200, such as a motor or other driving mechanism. The processing circuitry 202 may be configured to control the drive 209 to move the autonomous agent 200 in a desired direction and at a desired velocity.

The memory 210 stores data and/or instructions such that, when the instructions are executed by the processing circuitry 202, cause the autonomous agent 200 to perform various functions as described herein. The memory 210 may be implemented as any well-known volatile and/or non-volatile memory. The memory 210 may be implemented as a non-transitory computer readable medium storing one or more executable instructions such as, for example, logic, algorithms, code, etc. The instructions, logic, code, etc., stored in the memory 210 may enable the features disclosed herein to be functionally realized. For hardware implementations, the modules shown in FIG. 2 associated with the memory 210 may include instructions and/or code to facilitate control and/or monitor the operation of such hardware components.

The manipulator 211 may be implemented as any suitable number and/or type of components configured to interact with and/or manipulate the environment and/or object(s) within the environment, such as a manipulator arm or other mechanism to interact with one or more objects. The manipulator 211 may additionally or alternatively include any suitable number and/or type of components configured to address and/or mitigate one or more hazards or accidents, such as fire suppression mechanisms (e.g. fire extinguisher), vacuum device, liquid removal mechanisms (e.g. mopping device, liquid vacuum), broom or other sweeping devices, shovels or other plowing blades or devices, or other mechanisms as would be understood by one of ordinary skill in the art. Such mitigation components may be included, for example, in configurations where the AMR 102 is configured as a hazard response robot (HRR) that is configured to address and/or mitigate a detected hazard or anticipated/potential hazard.

According to the disclosure, the AMR 102 may be alternatively or additionally configured to explore the environment for potential or present hazards, estimate a hazard risk value/level for potential hazardous situations, and/or perform one or more actions to mitigate or otherwise address a detected potential or present hazard. The AMR 102 may perform one or more of these functions under the control of the computing device 108 and/or server 110. In exploring the environment 100, the AMR 102 perform one or more actions within the environment 100 and detect corresponding effects or impacts of the performed actions using one or more of its sensors 204. The sensor data generated therefrom may be provided to the computing device 108 and/or server 110 (and/or one or more other AMRs 102) as feedback data. Additionally, this feedback data can include the corresponding action(s) performed by the AMR 102.

The type of AMR 102 may be selected for the anticipated user of the environment 100. For example, if it is expected that humans will be within the environment 100 (and exposed to potential and actual hazards), the AMRs 102 deployed to explore the environment 100 can be selected and configured to mimic the human form (e.g. humanoid shaped robots). Similarly, if a particular type or configuration of robots are expected within the environment 100, the AMRs 102 can be selected and configured to mimic the size, shape, and movement characteristics of the expected robots.

Computing Device (Controller) Design and Configuration

Figure 3:
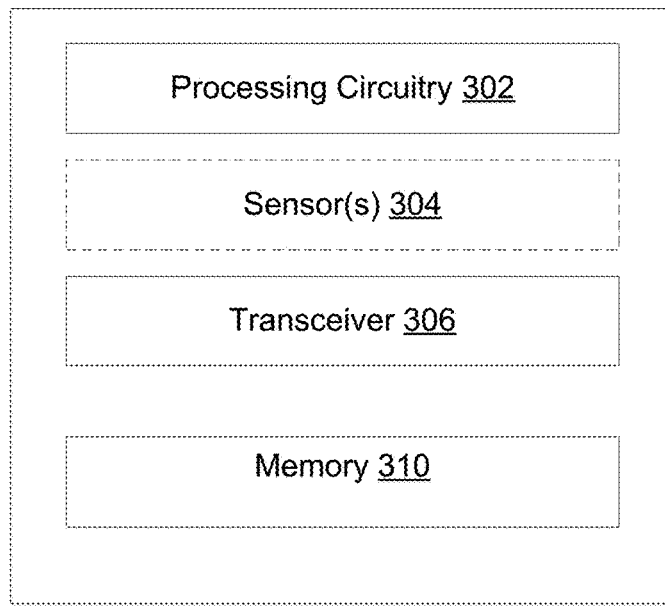
FIG. 3 illustrates a block diagram of an exemplary computing device (controller) in accordance with the disclosure.

FIG. 3 illustrates a block diagram of an exemplary computing device 300, in accordance with the disclosure. The computing device (controller) 300 as shown and described with respect to FIG. 3 may be identified with the computing device 108 and/or server 110 as shown in FIG. 1 and discussed herein, for instance. The computing device 300 may be implemented as an Edge server and/or Edge computing device, such as when identified with the computing device 108 implemented as an Edge computing device and/or as a cloud-based computing device when identified with the server 110 implemented as a cloud server.

The computing device 300 may include processing circuitry 302, one or more sensors 304, a transceiver 306, and a memory 310. In some examples, the computer device 300 is configured to interact with one or more external sensors (e.g. sensor 120) as an alternative or in addition to including internal sensors 304. The components shown in FIG. 3 are provided for ease of explanation, and the computing device 300 may implement additional, less, or alternative components as those shown in FIG. 3.

The processing circuitry 302 may be configured as any suitable number and/or type of computer processors, which may function to control the computing device 300 and/or other components of the computing device 300. The processing circuitry 302 may be identified with one or more processors (or suitable portions thereof) implemented by the computing device 300.

The processing circuitry 302 may be configured to carry out instructions to perform arithmetical, logical, and/or input/output (I/O) operations, and/or to control the operation of one or more components of computing device 300 to perform various functions as described herein. For example, the processing circuitry 302 may include one or more microprocessor cores, memory registers, buffers, clocks, etc., and may generate electronic control signals associated with the components of the computing device 300 to control and/or modify the operation of these components. For example, the processing circuitry 302 may control functions associated with the sensors 304, the transceiver 306, and/or the memory 310.

According to the disclosure, the processing circuitry 302 may be configured to: determine and/or select the type of AMR 102 to be deployed within the environment 100; control (possibly in collaboration with the AMR(s) 102) the operation of the AMR(s) 102 within the environment 100, such as controlling the AMR(s) 102 to explore the environment 100 to determine potential or present hazards within the environment 100; estimate a hazard risk value/level for potential hazardous situations within the environment 100; control the AMR(s) 102 to perform one or more actions to mitigate or otherwise address a detected potential or present hazard within the environment; control the AMR(s) 102 to gather additional data or information about a detected potential or present hazard (e.g. as identified by another AMR, human, or sensor 120); to gather information or data for a location within the environment 100 that may be insufficiently identified or known to the system (e.g. due to a lack of sensors 120 at the location); and/or one or more other functions as would be understood by one of ordinary skill in the art.

The sensors 304 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, etc. In some examples, the computing device 300 is additionally or alternatively configured to communicate with one or more external sensors similar to sensors 304 (e.g. sensor 120 in FIG. 1).

The transceiver 306 may be implemented as any suitable number and/or type of components configured to transmit and/or receive data packets and/or wireless signals in accordance with any suitable number and/or type of communication protocols. The transceiver 306 may include any suitable type of components to facilitate this functionality, including components associated with known transceiver, transmitter, and/or receiver operation, configurations, and implementations. Although depicted in FIG. 3 as a transceiver, the transceiver 306 may include any suitable number of transmitters, receivers, or combinations of these that may be integrated into a single transceiver or as multiple transceivers or transceiver modules. For example, the transceiver 306 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 306 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

The memory 310 stores data and/or instructions such that, when the instructions are executed by the processing circuitry 302, cause the computing device 300 to perform various functions as described herein. The memory 310 may be implemented as any well-known volatile and/or non-volatile memory. The memory 310 may be implemented as a non-transitory computer readable medium storing one or more executable instructions such as, for example, logic, algorithms, code, etc. The instructions, logic, code, etc., stored in the memory 310 are may be represented by various modules which may enable the features described herein to be functionally realized. For example, the memory 310 may include one or more modules representing an algorithm, such a path planning module configured to perform the path planning operations. For hardware implementations, the modules associated with the memory 310 may include instructions and/or code to facilitate control and/or monitor the operation of such hardware components. Thus, the disclosure includes the processing circuitry 302 executing the instructions stored in the memory in conjunction with one or more hardware components to perform the various functions described herein.

Figure 4:
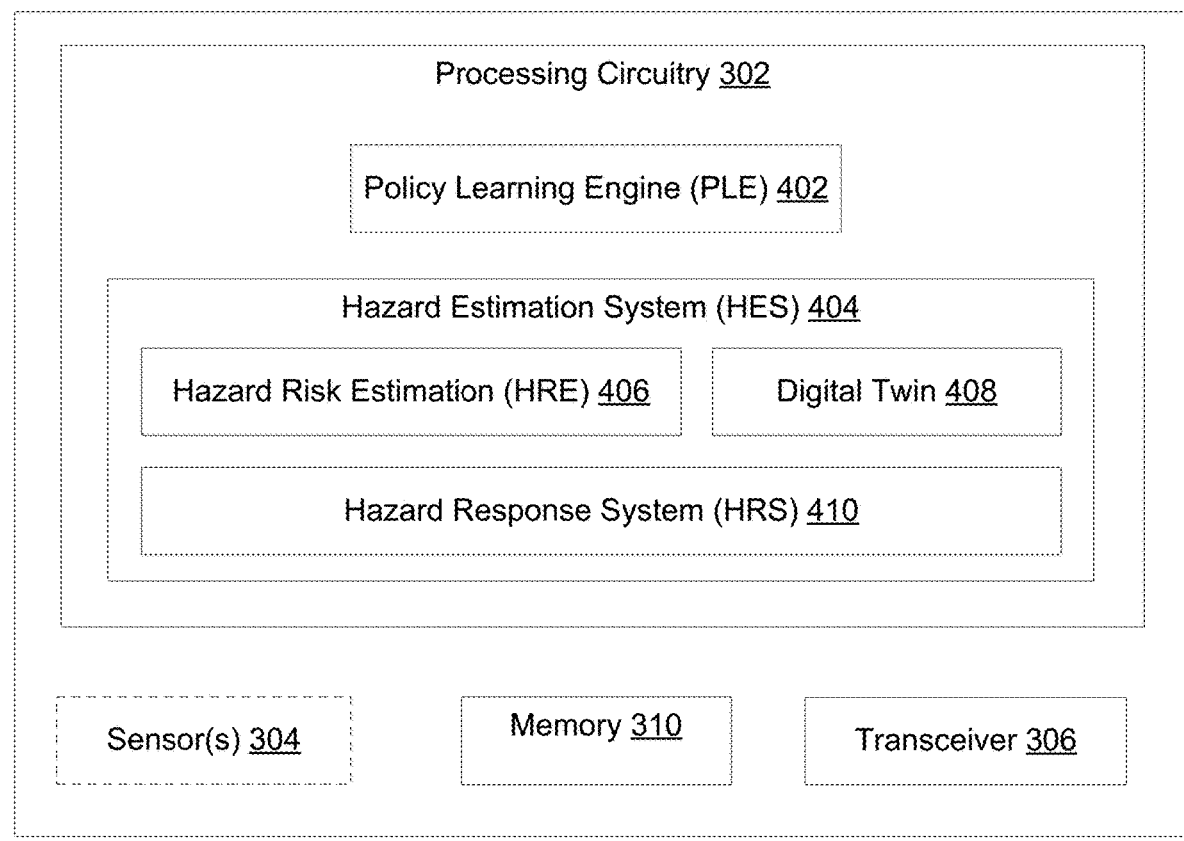
FIG. 4 illustrates a block diagram of an exemplary computing device (controller) in accordance with the disclosure.

FIG. 4 illustrates a block diagram of an exemplary computing device 400, in accordance with the disclosure. The computing device (controller) 400 as shown and described with respect to FIG. 4 may be identified with the computing device 300, computing device 108 and/or server 110 as shown in FIG. 1 and discussed herein. Similar to the computing device 300, the computing device 400 may be implemented as an Edge server and/or Edge computing device, such as when identified with the computing device 108 implemented as an Edge computing device and/or as a cloud-based computing device when identified with the server 110 implemented as a cloud server. The discussion of the computing device 400 and the operation thereof will be made with further reference to FIGS. 5A-6B, which show the process flow of the computing device 400 and AMRs 102 in operation.

FIG. 4 illustrates the processing circuitry 302 in more detail according to the present disclosure. The processing circuitry 302 may include a policy learning engine (PLE) 402 and a Hazard Estimation System (HES) 404. The HES 404 may further include a Hazard Risk Estimation (HRE) 406, a Digital Twin 408, and a Hazard Response System (HRS) 410.

Figure 5A:
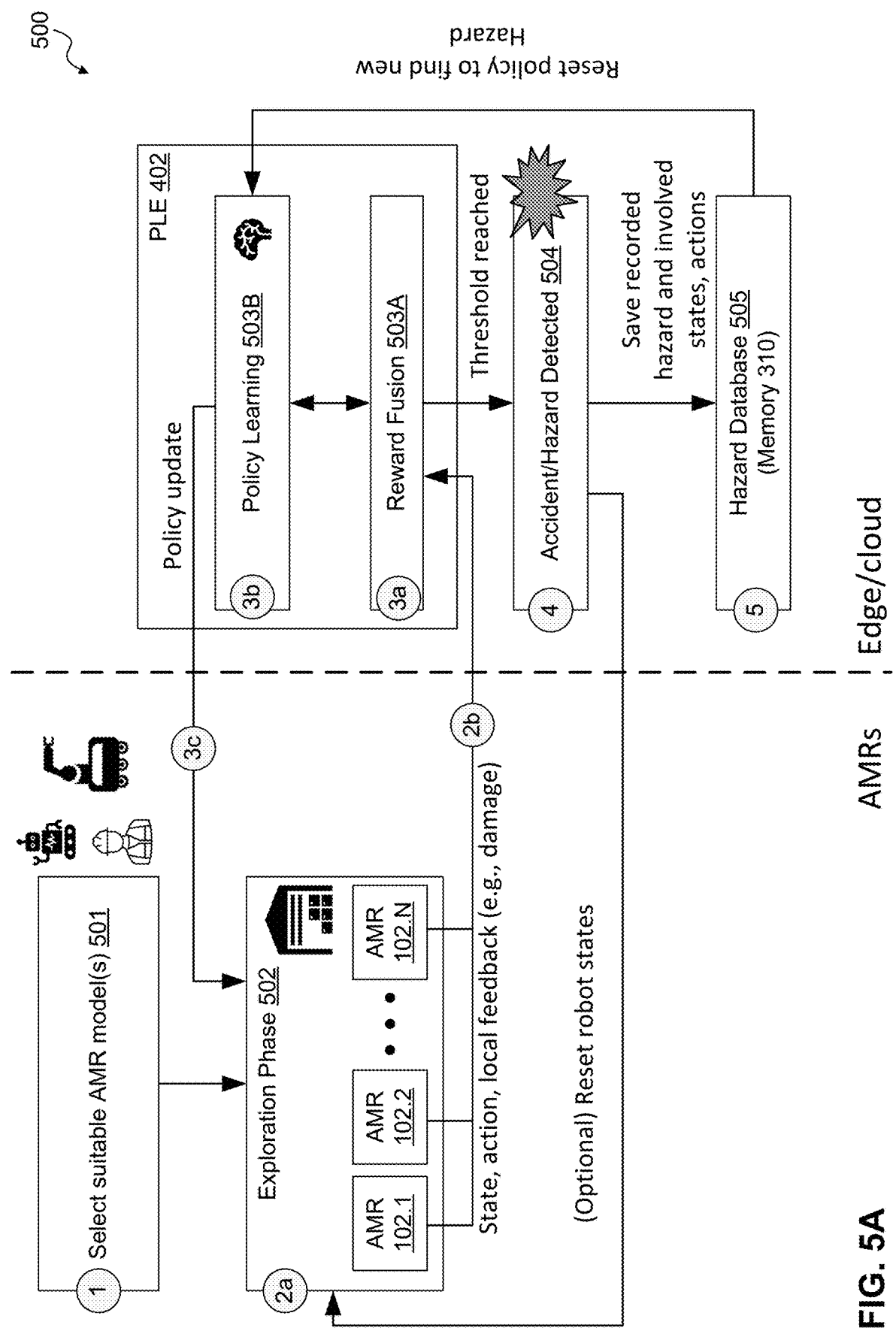
FIGS. 5A-5B illustrate operational flowcharts of the computing device and AMRs in accordance with the disclosure.

As shown in FIG. 5A, one or more AMR types are determined and selected for the environment (operation 501/1). For example, the processing circuitry 302 may be configured to determine and/or select the type of AMR 102 to be deployed within the environment 100. The AMR type may be selected so as to correspond to the expected users within the environment (e.g. humanoid shaped for human users). Alternatively or additionally, the AMR type may be selected based on a user input.

The AMR(s) 102 may then explore the environment 100 (operation 502/2a) to determine potential or present hazards within the environment 100 to detect one or more hazards. The AMRs 102 may additionally or alternatively estimate a hazard risk value/level for potential hazardous situations within the environment 100, perform one or more actions to mitigate or otherwise address a detected potential or present hazard within the environment 100; gather additional data or information about a detected potential or present hazard (e.g. as identified by another AMR, human, or sensor 120), gather information or data for a location within the environment 100 that may be insufficiently identified or known to the system (e.g. due to a lack of sensors 120 at the location); and/or one or more other functions as would be understood by one of ordinary skill in the art. Based on the exploration, the AMR(s) 102 may provide data (operation 2b) to the PLE 402.

The AMR(s) 102 may explore the environment and perform one or more actions. The action may be random, at least initially, but are not limited thereto. Example actions may include: Move straight, to the left, to the right; Accelerate, brake, stop; Raise or lower arm or other member; Jump; Lift or drop a load; Grab, touch, push or pull an object; Push/actuate a button, lever, or there actuation device; manipulate one or more objects within the environment; and/or or more actions as would be understood by one of ordinary skill in the art. To limit the search space and/or prevent unnecessary damages to the robots, a set of blacklist rules may be applied to exclude certain actions, such as "self-destructive" actions like purposefully and repeatedly running into objects or unnecessary actions like accelerating and braking at full power.

The AMR(s) 102 may continuously observes the environment 100 and/or the integrity of the AMR using one or more built in sensors 204 (e.g. camera, IR camera, Lidar, radar, or haptic sensors). Additionally or alternatively, the AMR(s) 102 may observe the environment using one or more external sensors 120 within the environment that provide sensor data to the AMR(s) 102.

The PLE 402 is configured to process the data received from the AMR(s) 102. The data may include state information of the AMR 102 (e.g. data corresponding to the current operational state of the AMR 102), data corresponding to one or more actions performed by the AMR 102 within the environment 100, response data corresponding to any resulting occurrence from the performed action, data corresponding to the physical and/or operational integrity of the AMR, data of a perceived hazard, potential hazard, threats, or the like (e.g. the camera may detect a part falling to the ground very close to the AMR), and other data as would be understood by one of ordinary skill in the art. The data received by the PLE 402 from the AMR(s) 102 may be collectively referred to as feedback data. The actions performed by the AMR 102 may be randomly selected in one or more configurations.

The PLE 402 may be configured to combine the feedback data from the AMRs 102 to a global reward (operation 503A/3a) to determine whether a hazard has occurred (operation 504/4). The individually reported states and response of the feedback data (e.g. damage, near accident, etc.) are interpreted and fused to a global feedback that reflects the overall hazard exploration of the environment 100 by the AMRs 102.

The PLE 402 (reward fusion module 503A) may determine if the global reward is greater or equal to a hazard threshold, and if the threshold has been has reached, the PLE 402 detects (at operation 504/4) a hazard (or near hazard).

The hazard threshold may be adjusted or set to adjust the detection sensitivity of the computing device 400/500. For example, a higher threshold value focuses the detection on actual hazards, such as those that represent actual physical damage to the AMR 102 or the environment, while a lower threshold value focuses the detection on more subtle, undesired situations or potential hazards (e.g. threats, robots stuck). Example sequences of actions may include: AMR 102.1 actuates a button within the environment 100, which cases AMR 102.2 to receive an electrical shock from a broken cable/wire associated with the button; or AMR 102.1 tries to lift a load from a work bench, and the load falls down and hits AMR 102.2 who happens to be located on the other side of the bench.

The processing circuitry 302 may then store the detected hazards or potential hazards in a hazard database (operation 505/5), such as in memory 310. In some configurations, the PLE 402 can reset the policy when a hazard is detected so that the AMRs 102 are not led to the same hazard from a previous iteration. The database of hazards maybe used to train AMRs 102 to avoid identified hazards in the future. Additionally or alternatively, human analysis may be added to assign a mitigation action to one or more of the detected hazards. Examples for such mitigation actions are: lower speed, change in direction, stop or avoid a location altogether.

The PLE 402 may then optimize the reward (e.g. maximize the global damage) based on the feedback data (e.g. the state information) (operation 503B/3b). For example, the global reward may then be subject to maximization during the learning process by the PLE 402, where the higher the global reward reflects a more hazardous environment.

The PLE 402 may then generate a policy update based on the optimized global reward. The policy update may then be provided to the AMR(s) 102 (operation 3c), which then select the next action. The policy update may include individual policies (rewards) for the respective AMRs (probability of performing an action in a given state) by segmenting the global reward. According to the disclosure, AMRs 102 that are similarly configured and/or have the same capabilities may use the same policies. Heterogeneous robots will learn different policies.

The PLE 402 may use one or more machine learning models, such as supervised learning, semi-supervised learning, unsupervised learning, or reinforcement learning techniques. According to the disclosure, operation of the PLE 402 is described as being configured to perform reinforcement learning techniques, but is not limited thereto. Reinforcement learning models may be given positive or negative feedback to improve accuracy. A reinforcement learning model may attempt to maximize one or more objectives/rewards. Techniques that may be implemented in a reinforcement learning model may include, for example, Q-learning, temporal difference (TD), and deep adversarial networks. In this non-supervised learning technique, the agent experiences and interprets a reward resulting from an action on the environment. This feedback data recursively updates a policy, which defines the probability of subsequent actions. The PLE 402 may then learn an optimal combination of actions to manipulate the environment 100.

Figure 5B:
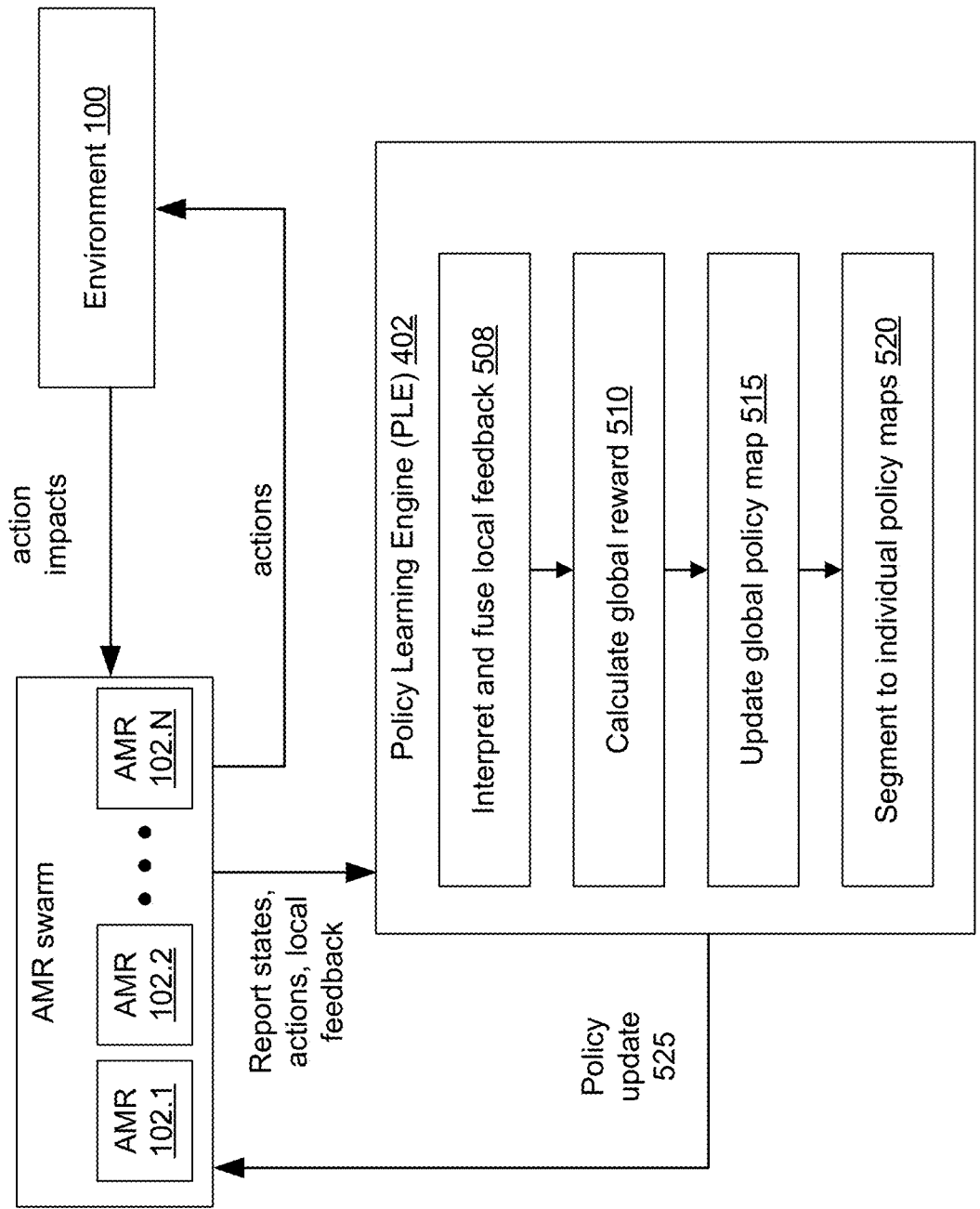

With reference to FIG. 5B, the functions and operation of the PLE 402 may include: interpreting and fusing local feedback data (508), calculating global reward (510) based on the fused feedback data, updating the global policy map (515) based on the global reward, and segmenting the updated global policy map to generate individual policy maps (520) for the AMRs 102. The individual policy maps may corresponding to the exploration policy governing the exploration of the environment 100 by the AMRs 102.

To interpret and fuse local feedback data (508) and calculate the global reward (510) based on the fused feedback data, the PLE 402 is configured to interpret and fuse the individually reported states and response of the feedback data (e.g. damage, near accident, etc.) to generate a global feedback that reflects the overall hazard exploration of the environment 100 by the AMRs 102.

The PLE 402 may then update the global policy map (515) based on the global reward. The updating may include optimizing the reward (e.g. maximize the global damage) based on the feedback data (e.g. the state information) (operation 503B/3b). For example, the global reward may then be subject to maximization during the learning process by the PLE 402, where the higher the global reward reflects a more hazardous environment.

The PLE 402 may then segment the global reward (at 520) to generate a policy update that includes individual policies (rewards) for the respective AMRs (probability of performing an action in a given state). For example, the PLE 402 may then generate a policy update based on the optimized global reward by segmenting the global reward.

The exploration of the environment 100 by the AMRs 102 advantageously identify hazards and/or hazards as well as actions or sequence of actions that result in such hazards. One or more mitigation actions may then be performed to mitigate or reduce the impact of hazards/potential hazards to reduce the occurrence of future hazards within the environment 100.

Hazard Estimation System

Returning to FIG. 4, the Hazard Estimation System (HES) 404 is further described with additional reference to FIGS. 6A-8B. Again, the HES 404 may include a Hazard Risk Estimation (HRE) 406, a Digital Twin 408, and a Hazard Response System (HRS) 410.

The HES 404 may be configured to receive information 602 about the environment 100 from one or more sources. The information 602 may include dynamic information 604 and/or static information 606. The information 602 may be received from one or more differences sources, such as location, type and count of items/objects with the environment 100 (e.g. provided by the inventory management software), the position and/or poses of one or more machines and/or robots within the environment 100, data from a one or more sensors 120 (e.g., cameras, Lidar, infrared cameras, indoor climate sensors, smoke detectors, or the like), and/or the location of a human-reported alarm. Additionally or alternatively, static information may be received, such as information about the building (e.g., floor layout, location of gas/water/etc. pipes) and the layouts of existing tools and machines.

Figure 6A:
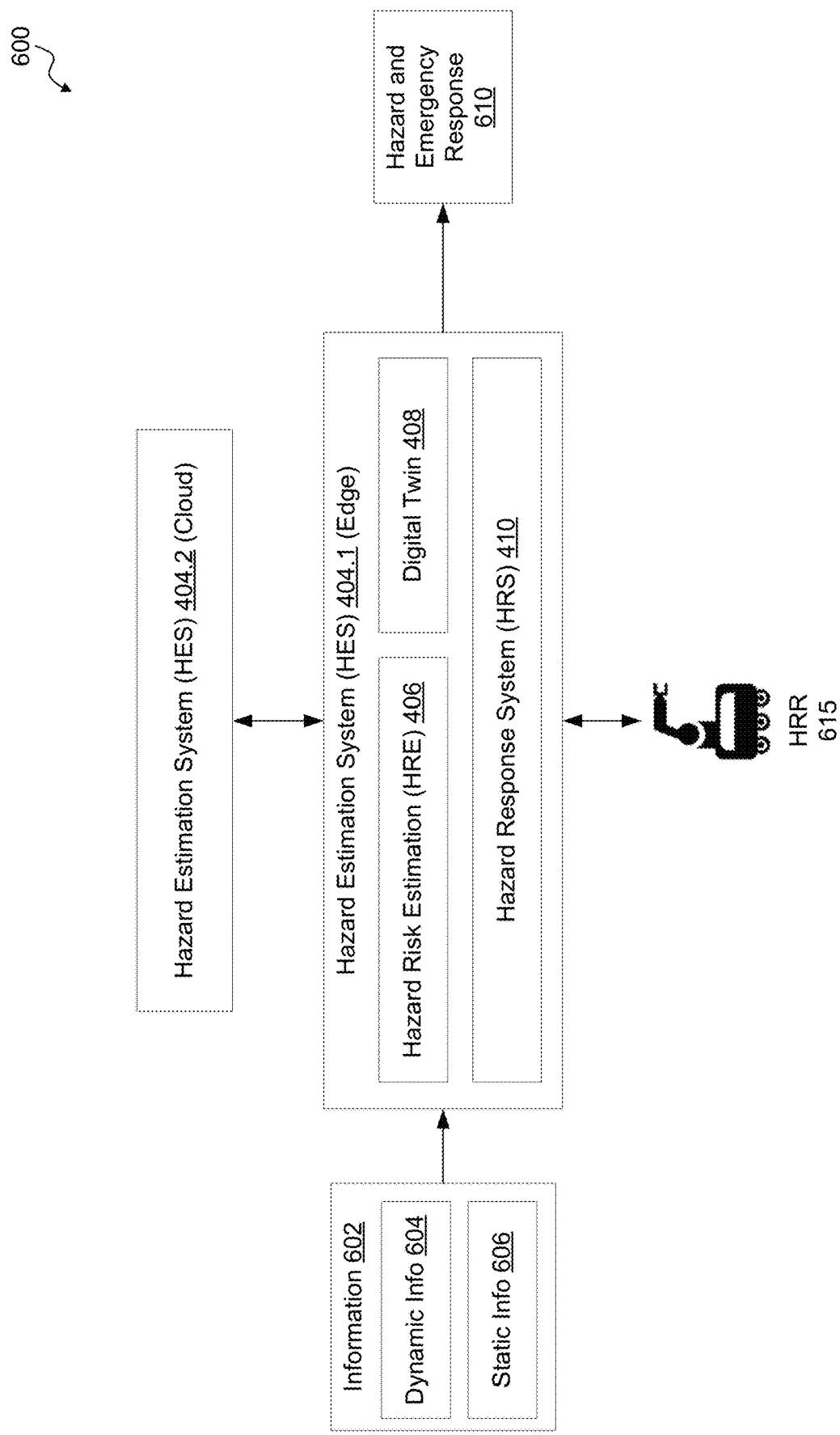
FIG. 6A illustrates a block diagram of an exemplary Hazard Estimation and Response System in accordance with the disclosure.
Figure 6B:
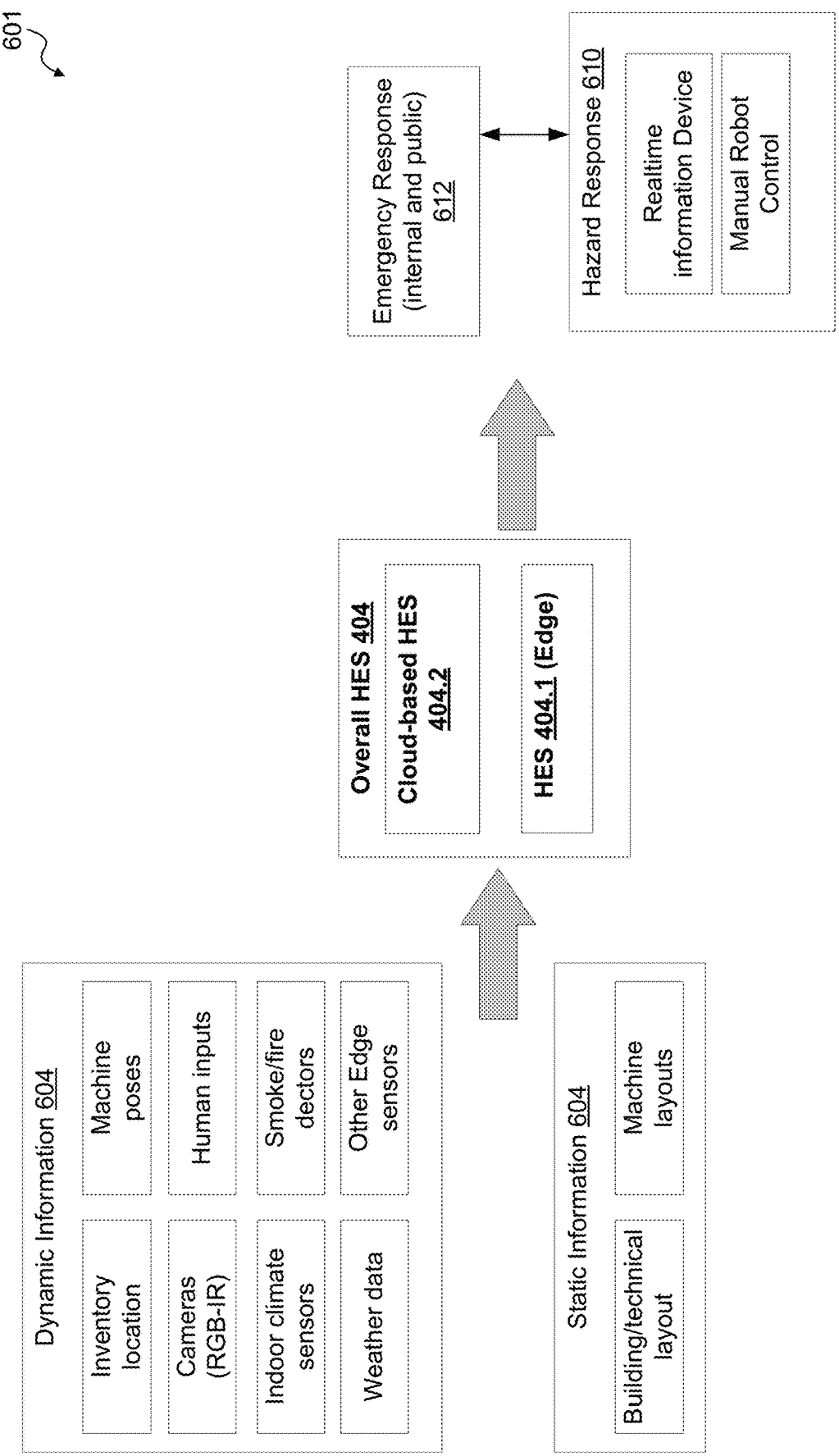
FIG. 6B illustrates an operational flowchart of a Hazard Estimation and Response System in accordance with the disclosure.

As shown in FIG. 6B, the dynamic information 604 may include information about one or more dynamic objects within or about the environment 100, such as the location of inventory, machines, or other dynamic objects; sensor data from one or more sensors 120, weather data; human inputted data; data from one or more AMRs 102; and/or other information or data as would be understood by one of ordinary skill in the arts. The static information 606 may include information about one or more static objects within or about the environment 100, such as the building layout define the environment 100, the layout of machines within the environment 100; the location of other static objects within the environment 100; and/or other information or data as would be understood by one of ordinary skill in the arts.

Hazard Risk Estimation (HRE)

The HRE 406 of the HES 404 may be configured to calculate (e.g. continuously or repeatedly) a hazard risk value based on the received information 602. The hazard risk value corresponds to the likelihood of a hazard occurring at a particular location in the environment. The hazard risk value may be a static and/or dynamic location-based risk level for different hazards. For example, the risk value could represent the risk associated with a fire, water/gas leakage, power outage or structural collapse (e.g., snow on roof).

The HRE 406 may additionally or alternatively calculate the hazard risk value based on one or more simulations. For example, the HRE 406 may use a simulated representation to apply certain models for the future behavior, such as a physics model that is able to predict the spread of a fire depending on the materials, dimensions, and positions of items in the surrounding of hot areas. A prediction of human behavior could additionally or alternatively be used to estimate the process of an evacuation (e.g. if certain exits are blocked). As another example, a simulation model could be used to predict the flow of items that are inherently hazardous (e.g., explosive batteries, chemicals, etc.).

Figure 7:
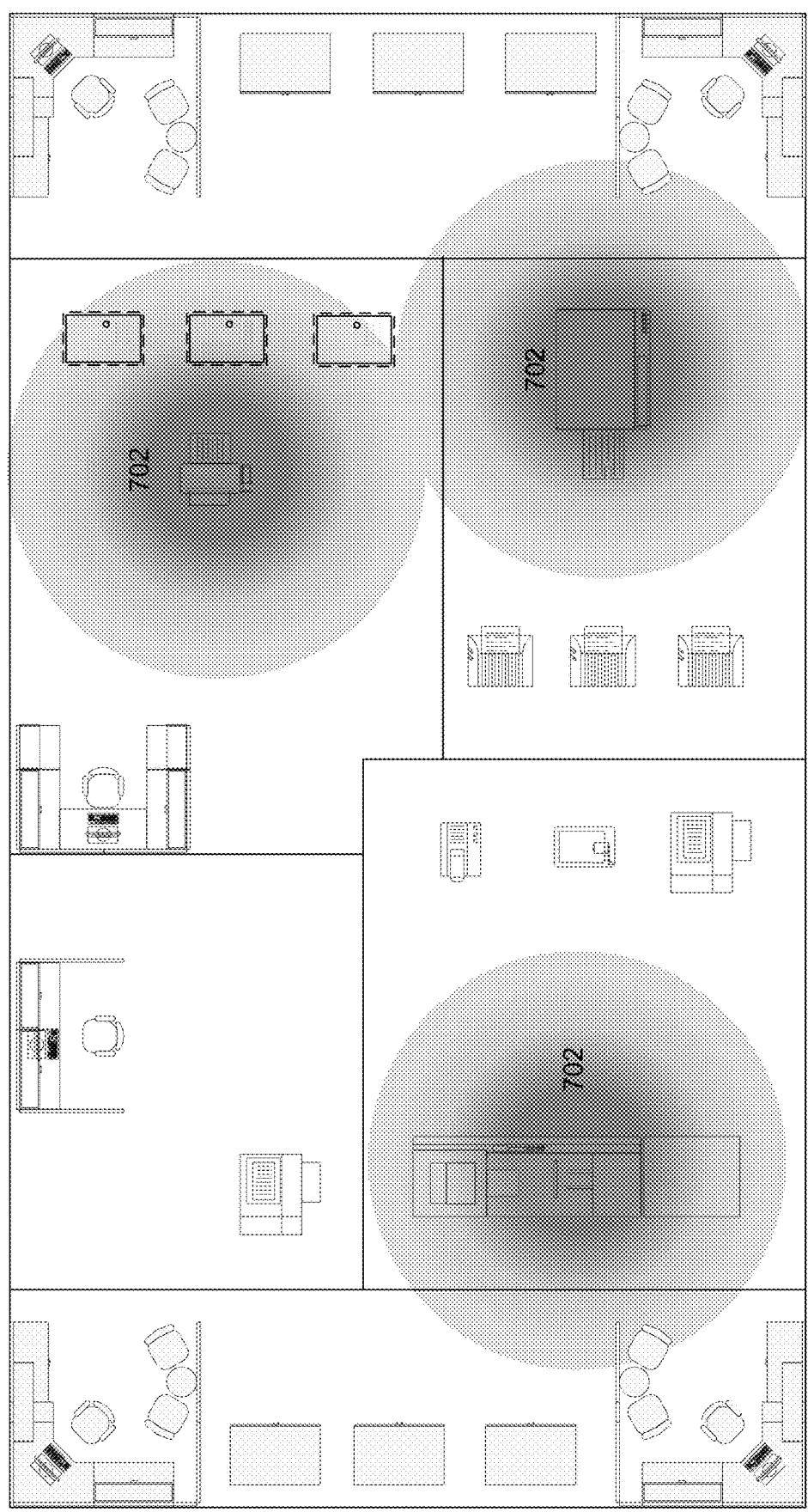
FIG. 7 illustrates a heatmap of the environment in accordance with the disclosure.

Additionally or alternatively, as illustrated in FIG. 7, the HRE 406 is configured to generate one or more heatmaps 700 based on the estimated location-specific hazard risk values. The heatmap 700 shows areas 702 of the environment having increased hazard risk levels According to the disclosure, the Digital Twin 408 may be configured as a virtual model configured to accurately reflect a physical object, such as the environment 100. The sensor(s) 120 within the environment 100 detect information and data of the environment 100, and such data is used by the digital twin 408 to run simulations to study performance issues and generate possible improvements. The knowledge determine by the digital twin 408 may then be used to determine one or more hazard risk values. Such determination can be in addition to or as an alternative to the determination by the HRE 406. In some configurations, the digital twin 4087 and the HRE 406 cooperatively determine the hazard risk value(s).

Additionally or alternatively, the information 602 may include information gathered from one or more AMRs 102, such as information gathered during an exploration phase of the environment 100 as discussed above with reference to FIGS. 5A-5B.

According to the disclosure, the hazard risk level may reflect various types of risk levels, such as the risk for harming humans, financial risk or repair costs, legal risk, environmental risk, privacy exposure, or other risk types as would be understood by one of ordinary skill in the art. Additionally or alternatively, the risk level value can reflect the ability of a location within the environment 100 to be evaluated for a hazard risk. Additionally or alternatively, the hazard risk value may include a certainty value corresponding to a level of certainty that is associated with the estimation of the risk level.

Figure 8B:
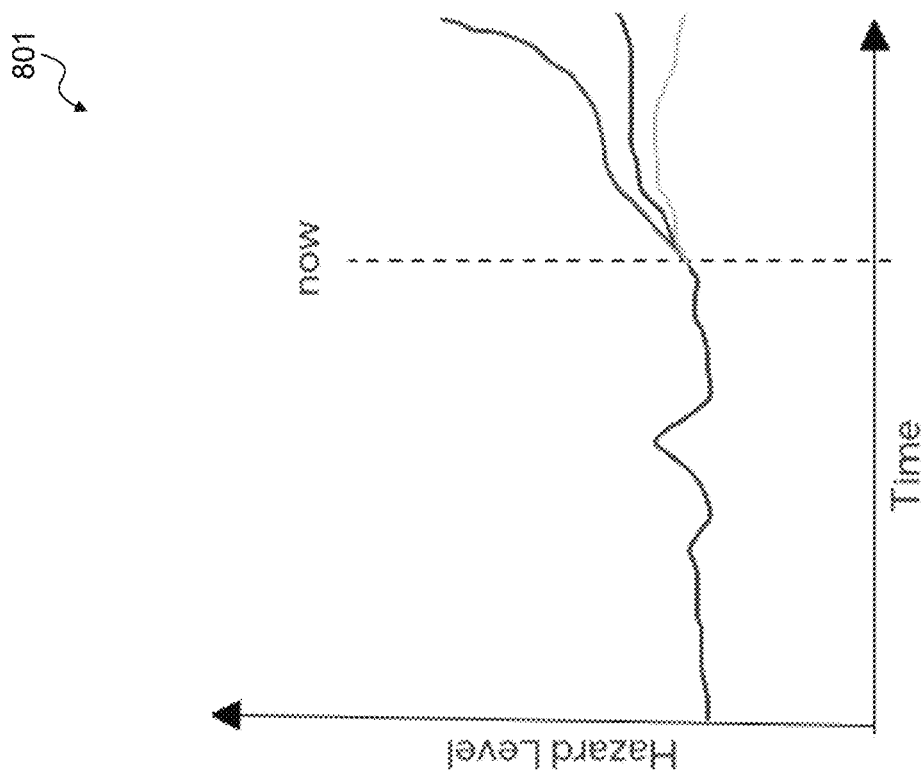
FIGS. 8A-8B illustrate plots of hazard risk levels in accordance with the disclosure.
Figure 8A:
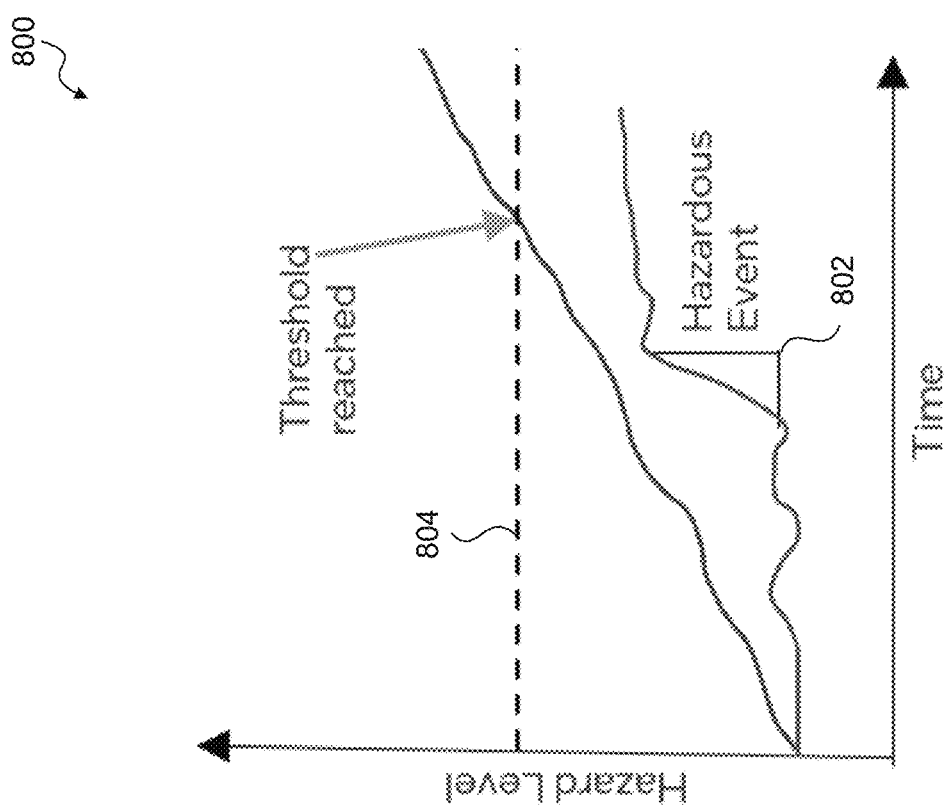

With reference to FIGS. 8A-8B, the HES 404 may be configured to detect hazardous events or potential hazardous events. The detection may be based on the hazard risk level. According to the disclosure, the HES 404 may detect a hazardous event or potential hazardous event based on the rate of change 802 of the estimated hazard risk level as shown in plot 800 of FIG. 8A. For example, if the estimated hazard risk level increases sharply in a short period of time (i.e. the rate of change of the risk level exceeds a rate-of-change threshold value), the HES 404 may determine that a hazard has or will likely occur. Additionally or alternatively, HES 404 may detect a hazardous event or potential hazardous event based the hazard risk value exceeding a risk level threshold 804. The threshold value and/or rate-of-change threshold value may be predetermined or adaptively adjusted by the HES 404 based on the information 602. The threshold values may be based on one or more government regulations, company regulations, or other entity as would be understood by one of ordinary skill in the art.

The detection of hazardous events may additionally or alternatively be based on one or more external alarms, human indications of a hazard, one or more sensors 102 (e.g. fire alarm), and/or one or more other detection parameters as would be understood by one of ordinary skill in the art. For example, a predictive hazard is that the monitoring system detects a high room temperature, a critical location of an element near a hot location that may quickly catch fire, the proximity of an explosive or combustible material, or the like. According to the disclosure, the HES 404 may learn over time situations that are potentially critical, and/or may leverage model knowledge.

The HES 404 may be implemented with machine-learning capabilities, and may use one or more machine learning models, such as supervised learning, semi-supervised learning, unsupervised learning, or reinforcement learning techniques.

Hazard Response System

Returning to FIGS. 6A-6B, the HES 404 may include a Hazard Response System (HRS) 410 that is configured to control one or more response actions taken by the HES 404 in response to a detected hazardous or potentially hazardous event. The HRS 410 may be configured to one or more AMRs 102 configured as a Hazard Response Robot (HRR) 615.

The HRS 410 may be configured to receive (e.g. continuously) the hazard estimation information (e.g. hazard risk value) from the HRE 406. If the HRE 406 reports areas for which an estimation was not possible, the HRS 410 may be configured to deploy the HRR 615 to the location to gather further data. The HRR 615 may be additionally or alternatively controlled to perform periodic, scheduled, or random patrols of the environment to gather additional data. The HRR 615 is configured and included similar components (e.g. sensors) as described above with reference to the AMRs 102.

Figure 9:
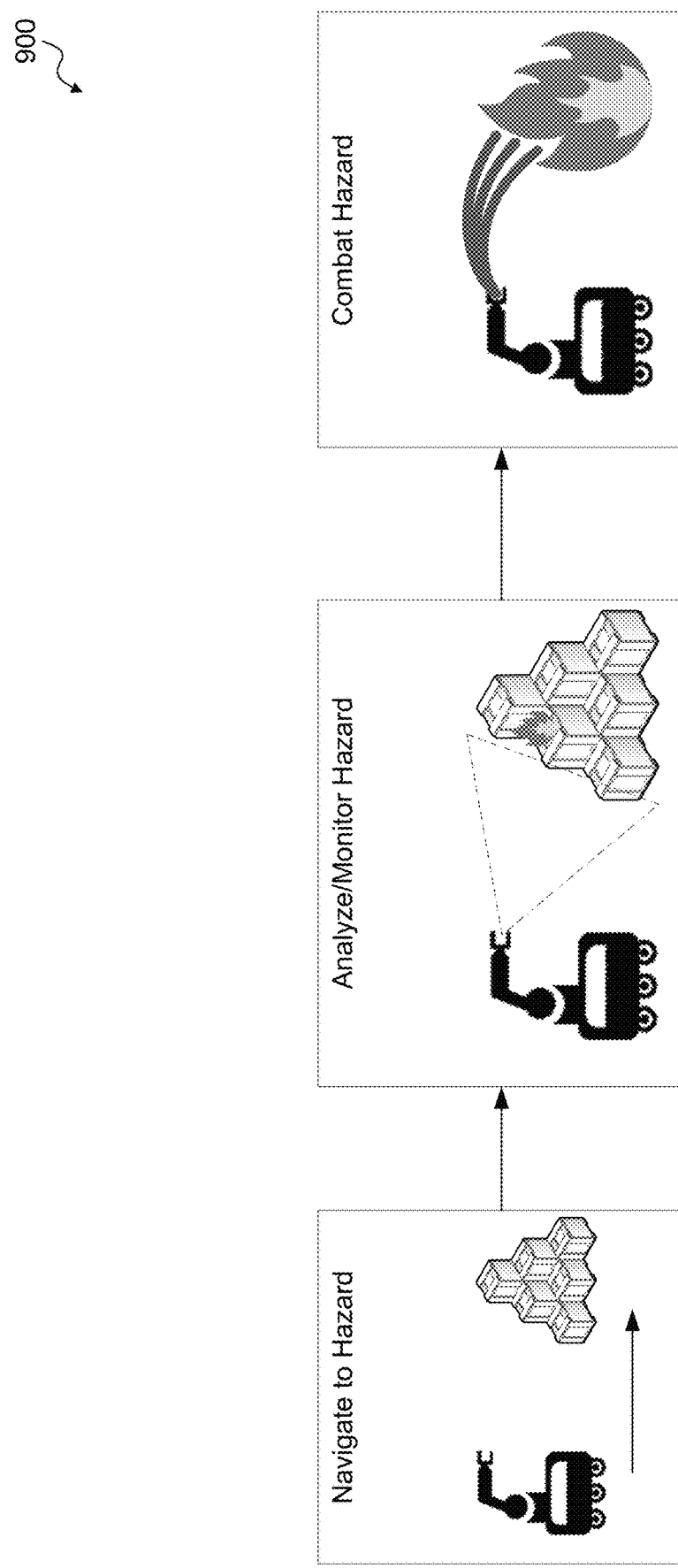
FIG. 9 illustrates an operational flowchart of a Hazard Response Robot in accordance with the disclosure.

The HRS 410 may be configured to operation in: 1) a preventative mitigation mode and 2) a hazard response mode. In the mitigation mode, the HRS 410 may be configured to perform one or more actions to eliminate or reduce an occurrence of a hazardous event. For example, the HRS 410 may be deployed to areas indicated on the heatmap 700 that correspond to an area with a high hazard risk value. The hazard response mode may be triggered when a hazardous event is detected and the HRR 615 is deployed to perform actions to mitigate or eliminate the hazard. The operation of the HRR 615 is further illustrated in FIG. 9, which shows the HRR 615 navigating to a potential hazardous location in the environment 100, monitoring/analyzing the events at the location, and combating the hazard if a hazard is detected.

In mitigation mode, the information from the HRE 406 is continuously monitored. If a hazardous event is detected, the HES 404 may generate a notification to notify the user or an emergency response team or agency of the hazardous event. The notification may be an electronic notification, an alarm, or the like.

HRS 410 may deploy a Hazard Response Robot (HRR) 615. The HRR 615 may be located at the facility and/or may be brought to the environment 100 by the ERT. The HRS 410 is configured to communicate with the HRR 615 to provide required information to allow the HRR 615 to navigate towards the hazardous event location (e.g., if a fire blocks a path towards it). Additionally, the ERT itself might be able to control the HRR 615 additionally or alternatively, such as when it is too dangerous for the ERT to enter the environment 100. The HRR 615 may additionally include a manipulator (e.g. manipulator 211) that may be implemented as any suitable number and/or type of components configured to interact with and/or manipulate the environment and/or object(s) within the environment, such as a manipulator arm or other mechanism to interact with one or more objects. The manipulator may additionally or alternatively include any suitable number and/or type of components configured to address and/or mitigate one or more hazards or accidents, such as fire suppression mechanisms (e.g. fire extinguisher), vacuum device, liquid removal mechanisms (e.g. mopping device, liquid vacuum), broom or other sweeping devices, shovels or other plowing blades or devices, or other mechanisms as would be understood by one of ordinary skill in the art.

The HRS 410 may alternatively or additionally instruct the user or response team to perform one or more countermeasures to combat the detected hazard. Additionally or alternatively, the HRS 410 may be configured to control one or more operations of the control system of the environment, such as control an inventory management system to store certain items differently to reduce the hazard risk level, control or adjust the operation of one or more AMRs 102 to reduce the risk associated with AMR activities within the environment 100.

According to the disclosure, if a hazardous event is identified, the HRS 410 may operate in a counter-action mode. Based on the alarm source, the HRS 410 may control the HRR 615 to deploy within the environment to further analyze the increased hazard level. Depending on the reported hazard, a further action may be taken, such as requesting for an Emergency Response Team (ERT) to be deployed to the hazardous event location. The ERT may receive this information via a tablet-like or even an augmented reality device. The countermeasures could then be planned precisely, e.g., by selecting the right fire extinguishing media. The augmented reality device supports the ERT for example when entering a building where orientation is difficult due to smoke. The HRS 410 may be configured to provide indoor localization support for such use cases.

According to the disclosure, the HES 404 may include an Edge-based HES 404.1 and a cloud based HES 404.2 to improve the availability of the overall HES. In this configuration, the Edge-based HES 404.1 can be configured as the primary computing device while the cloud-based HES 404.2 is configured as a redundant system. The cloud-based HES 404.2 may be configured to synchronize available data with the edge-based 404.1. The HES 404.2 may monitor the availability of the HES 404.1 take control of the processing load in the event of a loss or reduction in functionality and/or connection of the HES 404.1. In the event of a connection loss, the HES 404.2 can provide information to the ERT upon the detection of a hazard. The HES 404.2 may also maintain the last-known-good state of the HES 404.1 and be configured to provide that information to the ERT.

In other configurations, the HES 404.1 and 404.2 can cooperatively perform the operations of the HES, or the HES 404.2 may function as the primary device. However, given the locality of the HES 404.1, it is advantageous for the HES 404.1 at the Edge to be configured as the primary computing device to reduce latency.

EXAMPLES

The following examples pertain to various techniques of the present disclosure.

An example (e.g. example 1) relates to a controller for a hazard exploration system, comprising: a communication interface configured to communicate with one or more autonomous agents; and processing circuitry configured to: control the one or more autonomous agents to explore an environment; determine one or more hazards within the environment based on feedback data from the one or more autonomous agents; and generate an exploration policy for the one or more autonomous agent based on the feedback data.

Another example (e.g. example 2) relates to a previously-described example (e.g. example 1), wherein the processing circuitry comprises a policy learning engine configured to: interpret and fuse the feedback data from the one or more autonomous agents; calculate a global reward based on the fused feedback data; update a global policy map based on the global reward; segment the global policy map to generate an individual policy map for each of the one or more autonomous agents; and generate a policy update for the exploration policy based on the individual policy maps.

Another example (e.g. example 3) relates to a previously-described example (e.g. example 2), wherein feedback data from an autonomous agent of the one or more autonomous agents corresponds to an individual reward for the autonomous agent.

Another example (e.g. example 4) relates to a previously-described example (e.g. one or more of examples 2-3), wherein the policy learning engine is a reinforcement learning engine configured to performing reinforced learning.

Another example (e.g. example 5) relates to a previously-described example (e.g. one or more of examples 2-4), wherein the one or more hazards are determined based on the global reward exceeding a reward threshold.

Another example (e.g. example 6) relates to a previously-described example (e.g. one or more of examples 2-5), wherein the policy learning engine is configured to reset the exploration policy in response to the one or more hazards being determined.

Another example (e.g. example 7) relates to a previously-described example (e.g. one or more of examples 2-6), wherein corresponding states of the one or more autonomous agents are reset in response to the one or more hazards being determined.

Another example (e.g. example 8) relates to a previously-described example (e.g. one or more of examples 1-7), wherein the one or more autonomous agents are configured to perform actions within the environment and detect corresponding impacts of the performed actions, the feedback data generated by the one or more autonomous agents including the performed actions and the detected impacts.

Another example (e.g. example 9) relates to a previously-described example (e.g. example 8), wherein the actions performed by the one or more autonomous agents comprise random actions.

Another example (e.g. example 10) relates to a previously-described example (e.g. example 8), wherein the one or more hazards are determined based on the performed actions and detected impacts.

Another example (e.g. example 11) relates to a previously-described example (e.g. one or more of examples 1-10), wherein the feedback data includes physical integrity information for the one or more autonomous agents, whether the movement of the one or more autonomous agents is restricted or impaired, and/or a perceived potential accident or threat.

Another example (e.g. example 12) relates to a controller for a hazard estimation system, comprising: a communication interface configured to receive environmental data of an environment; and processing circuitry comprising: a hazard risk estimator (HRE) configured to estimate a hazard risk value based on the received environmental data, the hazard risk value corresponding to a likelihood of a hazard occurring at a corresponding location in the environment; and a hazard response system (HRS) configured to perform a hazard response action based on the estimated hazard risk level.

Another example (e.g. example 13) relates to a previously-described example (e.g. example 12), wherein the hazard response action comprises controlling one or more autonomous agents to explore the environment to obtain additional data.

Another example (e.g. example 14) relates to a previously-described example (e.g. example 13), wherein the HRE is configured to estimate the hazard risk value further based on the additional data.

Another example (e.g. example 15) relates to a previously-described example (e.g. one or more of examples 13-14), wherein the additional data is of a detected hazard occurring in the environment.

Another example (e.g. example 16) relates to a previously-described example (e.g. one or more of examples 12-15), wherein the hazard response action comprises reporting an occurrence of the hazard in the environment.

Another example (e.g. example 17) relates to a previously-described example (e.g. one or more of examples 12-16), wherein the hazard response action comprises performing one or more countermeasures within the environment to reduce the hazard risk value.

Another example (e.g. example 18) relates to a previously-described example (e.g. one or more of examples 12-17), wherein the hazard response action comprises performing one or more countermeasures within the environment to address a detected hazard occurring in the environment.

Another example (e.g. example 19) relates to a previously-described example (e.g. one or more of examples 12-18), wherein the environmental data comprises dynamic information of the environment and/or static information of the environment.

Another example (e.g. example 20) relates to a previously-described example (e.g. example 19), wherein: the static information comprises a building layout defining the environment and/or locations of static objects within the environment; and/or the dynamic information comprises: sensor data from one or more sensors within the environment and/or locations of dynamic objects within the environment.

Another example (e.g. example 21) relates to a previously-described example (e.g. one or more of examples 12-20), wherein the HRS is configured to perform the hazard response action in response to the estimated hazard risk level exceeding a threshold value.

Another example (e.g. example 22) relates to a previously-described example (e.g. one or more of examples 12-21), wherein the HRS is configured to perform the hazard response action in response to a rate of change of the estimated hazard risk level exceeding a rate-of-change threshold value.

Another example (e.g. example 23) relates to a previously-described example (e.g. one or more of examples 12-22), wherein the HRE is configured to control one or more autonomous agents to explore the environment based on the environmental data to cause the one or more autonomous agents to obtain additional data to supplement or update the environmental data.

Another example (e.g. example 24) relates to a previously-described example (e.g. one or more of examples 12-23), wherein the HRE is configured to generate a heat map based on the estimated hazard risk value.

Another example (e.g. example 25) relates to a previously-described example (e.g. one or more of examples 1-24), wherein the controller is an Edge computer.

Another example (e.g. example 26) relates to a previously-described example (e.g. one or more of examples 1-24), wherein the controller is at least partially comprised within an autonomous agent.

Another example (e.g. example 27) relates to a previously-described example (e.g. one or more of examples 1-24), wherein the controller is a cloud-based computer.

Another example (e.g. example 28) relates to a previously-described example (e.g. one or more of examples 1-24), wherein the controller is comprised within an Edge computer and/or cloud-based computer.

Another example (e.g. example 29) relates to a non-transitory computer-readable storage medium with an executable program stored thereon, that when executed, instructs a processor to: control one or more autonomous agents to explore an environment; determine one or more hazards within the environment based on feedback data from the one or more autonomous agents; and generate an exploration policy for the one or more autonomous agent based on the feedback data.

Another example (e.g. example 30) relates to a previously-described example (e.g. example 29), wherein, when the executable program is executed, the processor is further configured to: interpret and fuse the feedback data from the one or more autonomous agents; calculate a global reward based on the fused feedback data; update a global policy map based on the global reward; segment the global policy map to generate an individual policy map for each of the one or more autonomous agents; and generate a policy update for the exploration policy based on the individual policy maps.

Another example (e.g. example 31) relates to a non-transitory computer-readable storage medium with an executable program stored thereon, that when executed, instructs a processor to: estimate a hazard risk value based on the received environmental data, the hazard risk value corresponding to a likelihood of a hazard occurring at a corresponding location in the environment; and perform a hazard response action based on the estimated hazard risk level.

An example (e.g. example 32) relates to a controller for a hazard exploration system, comprising: interface means for communicating with one or more autonomous agents; and processing means for: controlling the one or more autonomous agents to explore an environment; determining one or more hazards within the environment based on feedback data from the one or more autonomous agents; and generating an exploration policy for the one or more autonomous agent based on the feedback data.

Another example (e.g. example 33) relates to a previously-described example (e.g. example 32), wherein the processing means comprises a policy learning engine configured to: interpret and fuse the feedback data from the one or more autonomous agents; calculate a global reward based on the fused feedback data; update a global policy map based on the global reward; segment the global policy map to generate an individual policy map for each of the one or more autonomous agents; and generate a policy update for the exploration policy based on the individual policy maps.

Another example (e.g. example 34) relates to a previously-described example (e.g. example 33), wherein feedback data from an autonomous agent of the one or more autonomous agents corresponds to an individual reward for the autonomous agent.

Another example (e.g. example 35) relates to a previously-described example (e.g. one or more of examples 33-34), wherein the policy learning engine is a reinforcement learning engine configured to performing reinforced learning.

Another example (e.g. example 36) relates to a previously-described example (e.g. one or more of examples 33-35), wherein the one or more hazards are determined based on the global reward exceeding a reward threshold.

Another example (e.g. example 37) relates to a previously-described example (e.g. one or more of examples 33-36), wherein the policy learning engine is configured to reset the exploration policy in response to the one or more hazards being determined.

Another example (e.g. example 38) relates to a previously-described example (e.g. one or more of examples 33-37), wherein corresponding states of the one or more autonomous agents are reset in response to the one or more hazards being determined.

Another example (e.g. example 39) relates to a previously-described example (e.g. one or more of examples 32-38), wherein the one or more autonomous agents are configured to perform actions within the environment and detect corresponding impacts of the performed actions, the feedback data generated by the one or more autonomous agents including the performed actions and the detected impacts.

Another example (e.g. example 40) relates to a previously-described example (e.g. example 39), wherein the actions performed by the one or more autonomous agents comprise random actions.

Another example (e.g. example 41) relates to a previously-described example (e.g. example 39), wherein the one or more hazards are determined based on the performed actions and detected impacts.

Another example (e.g. example 42) relates to a previously-described example (e.g. one or more of examples 32-41), wherein the feedback data includes physical integrity information for the one or more autonomous agents, whether the movement of the one or more autonomous agents is restricted or impaired, and/or a perceived potential accident or threat.

Another example (e.g. example 43) relates to a controller for a hazard estimation system, comprising: an interface for receiving environmental data of an environment; and processing means comprising: a hazard risk estimating means (HRE) for estimating a hazard risk value based on the received environmental data, the hazard risk value corresponding to a likelihood of a hazard occurring at a corresponding location in the environment; and a hazard response means (HRS) for performing a hazard response action based on the estimated hazard risk level.

Another example (e.g. example 44) relates to a previously-described example (e.g. example 43), wherein the hazard response action comprises controlling one or more autonomous agents to explore the environment to obtain additional data.

Another example (e.g. example 45) relates to a previously-described example (e.g. example 44), wherein the HRE is configured to estimate the hazard risk value further based on the additional data.

Another example (e.g. example 46) relates to a previously-described example (e.g. one or more of examples 44-45), wherein the additional data is of a detected hazard occurring in the environment.

Another example (e.g. example 47) relates to a previously-described example (e.g. one or more of examples 43-46), wherein the hazard response action comprises reporting an occurrence of the hazard in the environment.

Another example (e.g. example 48) relates to a previously-described example (e.g. one or more of examples 43-47), wherein the hazard response action comprises performing one or more countermeasures within the environment to reduce the hazard risk value.

Another example (e.g. example 49) relates to a previously-described example (e.g. one or more of examples 43-48), wherein the hazard response action comprises performing one or more countermeasures within the environment to address a detected hazard occurring in the environment.

Another example (e.g. example 50) relates to a previously-described example (e.g. one or more of examples 43-49), wherein the environmental data comprises dynamic information of the environment and/or static information of the environment.

Another example (e.g. example 51) relates to a previously-described example (e.g. example 50), wherein: the static information comprises a building layout defining the environment and/or locations of static objects within the environment; and/or the dynamic information comprises: sensor data from one or more sensors within the environment and/or locations of dynamic objects within the environment.

Another example (e.g. example 52) relates to a previously-described example (e.g. one or more of examples 43-51), wherein the HRS is configured to perform the hazard response action in response to the estimated hazard risk level exceeding a threshold value.

Another example (e.g. example 53) relates to a previously-described example (e.g. one or more of examples 43-52), wherein the HRS is configured to perform the hazard response action in response to a rate of change of the estimated hazard risk level exceeding a rate-of-change threshold value.

Another example (e.g. example 54) relates to a previously-described example (e.g. one or more of examples 43-53), wherein the HRE is configured to control one or more autonomous agents to explore the environment based on the environmental data to cause the one or more autonomous agents to obtain additional data to supplement or update the environmental data.

Another example (e.g. example 55) relates to a previously-described example (e.g. one or more of examples 43-54), wherein the HRE is configured to generate a heat map based on the estimated hazard risk value.

Another example (e.g. example 56) relates to a previously-described example (e.g. one or more of examples 32-55), wherein the controller is an Edge computer.

Another example (e.g. example 57) relates to a previously-described example (e.g. one or more of examples 32-55), wherein the controller is at least partially comprised within an autonomous agent.

Another example (e.g. example 58) relates to a previously-described example (e.g. one or more of examples 32-55), wherein the controller is a cloud-based computer.

Another example (e.g. example 59) relates to a previously-described example (e.g. one or more of examples 32-55), wherein the controller is comprised within an Edge computer and/or cloud-based computer.

Another example (e.g. example 60) relates to a system comprising the controller of a previously-described example (e.g. one or more of examples 1-59).

Another example (e.g. example 61) relates to a previously-described example (e.g. example 60), wherein the controller is within an edge computer, a cloud computer, and/or an autonomous agent.

Another example (e.g. example 62) relates to a previously-described example (e.g. one or more of examples 1-61), wherein the autonomous agent is an autonomous mobile robot.

Another example (e.g. example 63) relates to non-transitory computer-readable storage medium with an executable program stored thereon, that when executed, instructs a processor to perform a method as shown and described.

Another example (e.g. example 64) relates to an apparatus as shown and described.

Another example (e.g. example 65) relates a method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor," "processing circuitry," or "controller" as used herein may be understood as any kind of technological entity that allows handling of data. The data may be handled according to one or more specific functions executed by the processor, processing circuitry, or controller. Further, processing circuitry, a processor, or a controller as used herein may be understood as any kind of circuit, e.g., any kind of analog or digital circuit. Processing circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as processing circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processing circuitry detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception.

Furthermore, the terms "transmit," "receive," "communicate," and other similar terms encompass both physical transmission (e.g., the transmission of radio signals) and logical transmission (e.g., the transmission of digital data over a logical software-level connection). Processing circuitry, a processor, or a controller may transmit or receive data over a software-level connection with another processor, controller, or processing circuitry in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An "agent" may be understood to include any type of driven object. An agent may be a driven object with a combustion engine, a reaction engine, an electrically driven object, a hybrid driven object, or a combination thereof. An agent may be or may include a moving robot, a personal transporter, a drone, and the like.

The term "autonomous agent" may describe an agent that implements all or substantially all navigational changes, at least during some (significant) part (spatial or temporal, e.g., in certain areas, or when ambient conditions are fair, or on highways, or above or below a certain speed) of some drives. Sometimes an "autonomous agent" is distinguished from a "partially autonomous agent" or a "semi-autonomous agent" to indicate that the agent is capable of implementing some (but not all) navigational changes, possibly at certain times, under certain conditions, or in certain areas. A navigational change may describe or include a change in one or more of steering, braking, or acceleration/deceleration of the agent. An agent may be described as autonomous even in case the agent is not fully automatic (fully operational with driver or without driver input). Autonomous agents may include those agents that can operate under driver control during certain time periods and without driver control during other time periods. Autonomous agents may also include agents that control only some implementations of agent navigation, such as steering (e.g., to maintain an agent course between agent lane constraints) or some steering operations under certain circumstances (but not under all circumstances), but may leave other implementations of agent navigation to the driver (e.g., braking or braking under certain circumstances). Autonomous agents may also include agents that share the control of one or more implementations of agent navigation under certain circumstances (e.g., hands-on, such as responsive to a driver input) and agents that control one or more implementations of agent navigation under certain circumstances (e.g., hands-off, such as independent of driver input). Autonomous agents may also include agents that control one or more implementations of agent navigation under certain circumstances, such as under certain environmental conditions (e.g., spatial areas, roadway conditions). In some implementations, autonomous agents may handle some or all implementations of braking, speed control, velocity control, and/or steering of the agent. An autonomous agent may include those agents that can operate without a driver. The level of autonomy of an agent may be described or determined by the Society of Automotive Engineers (SAE) level of the agent (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the agent (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. According to the disclosure, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing an agent to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. A controller for a hazard exploration system, comprising:
    a communication interface configured to communicate with one or more autonomous agents; and
    processing circuitry configured to:
    control the one or more autonomous agents to explore an environment;
    determine one or more hazards within the environment based on feedback data from the one or more autonomous agents;
    generate an exploration policy for the one or more autonomous agent based on the feedback data;
    interpret and fuse the feedback data from the one or more autonomous agents;
    calculate a global reward based on the fused feedback data;
    update a global policy map based on the global reward;
    segment the global policy map to generate an individual policy map for each of the one or more autonomous agents; and
    generate a policy update for the exploration policy based on the individual policy maps.

2. The controller of claim 1, wherein feedback data from an autonomous agent of the one or more autonomous agents corresponds to an individual reward for the autonomous agent.

3. The controller of claim 1, wherein the processing circuitry comprises a policy learning engine that is a reinforcement learning engine configured to perform reinforced learning.

4. The controller of claim 1, wherein the one or more hazards are determined based on the global reward exceeding a reward threshold.

5. The controller of claim 1, wherein the processing circuitry is configured to reset the exploration policy in response to the one or more hazards being determined.

6. The controller of claim 1, wherein corresponding states of the one or more autonomous agents are reset in response to the one or more hazards being determined.

7. The controller of claim 1, wherein the one or more autonomous agents are configured to perform actions within the environment and detect corresponding impacts of the performed actions, the feedback data generated by the one or more autonomous agents including the performed actions and the detected impacts.

8. The controller of claim 7, wherein the performed actions comprise random actions.

9. The controller of claim 7, wherein the one or more hazards are determined based on the performed actions and detected impacts.

10. The controller of claim 1, wherein the feedback data includes physical integrity information for the one or more autonomous agents, whether movement of the one or more autonomous agents is restricted or impaired, and/or a perceived potential accident or threat.

11. The controller of claim 1, wherein the controller is an Edge computer.

12. A non-transitory computer-readable storage medium with an executable program stored thereon, that when executed, instructs a processor to:
    control the one or more autonomous agents to explore an environment;
    determine one or more hazards within the environment based on feedback data from the one or more autonomous agents;
    generate an exploration policy for the one or more autonomous agent based on the feedback data;
    interpret and fuse the feedback data from the one or more autonomous agents;
    calculate a global reward based on the fused feedback data;
    update a global policy map based on the global reward;
    segment the global policy map to generate an individual policy map for each of the one or more autonomous agents; and generate a policy update for the exploration policy based on the individual policy maps.

* * * * *